Figure 1:
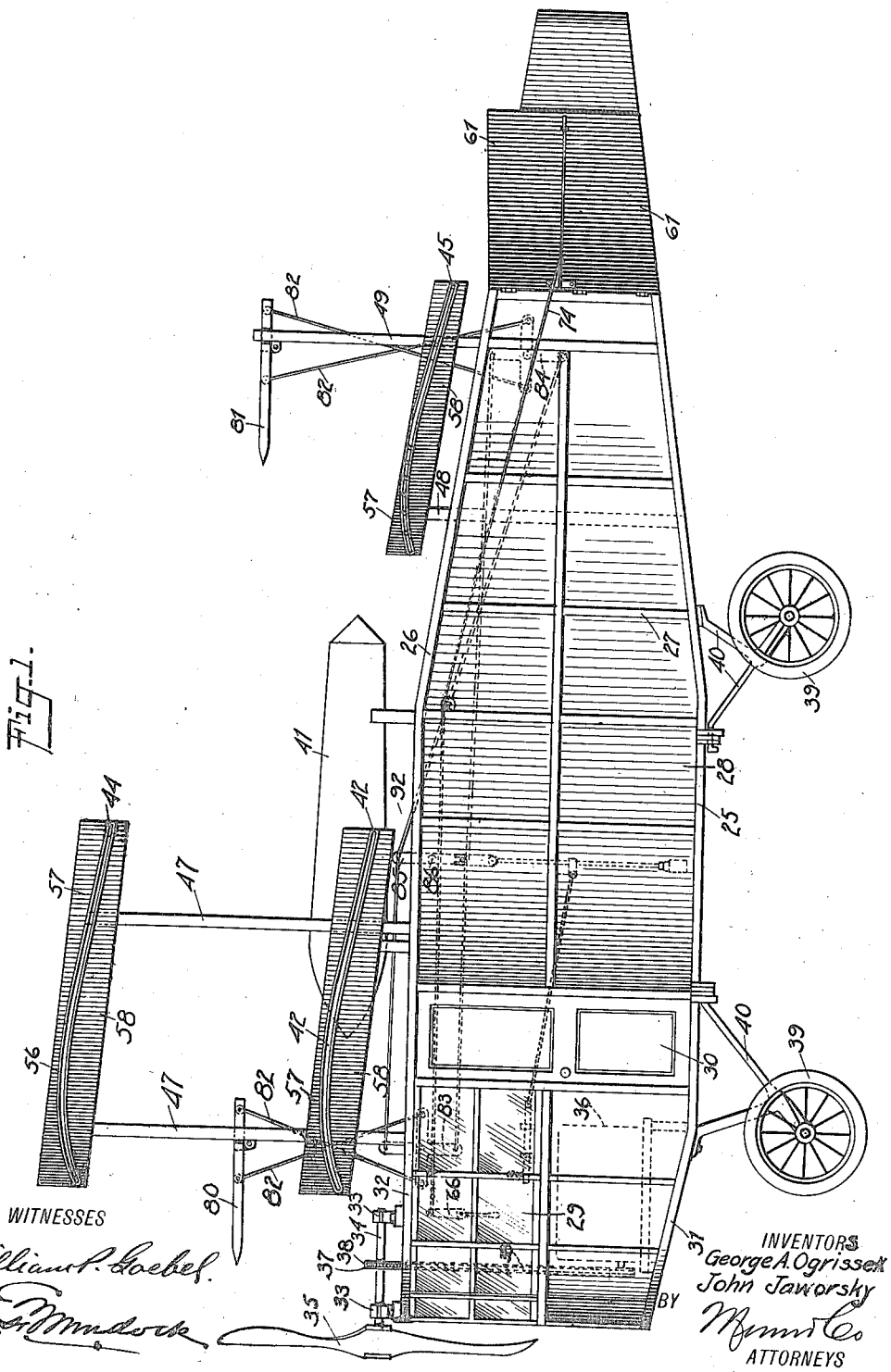

G. A. OGRISSEK & J. JAWORSKY.
AIRCRAFT.
APPLICATION FILED AUG. 27, 1914.

1,157,636.

Patented Oct. 19, 1915.
7 SHEETS—SHEET 1.

WITNESSES

INVENTORS
George A. Ogrissek
John Jaworsky
BY
ATTORNEYS

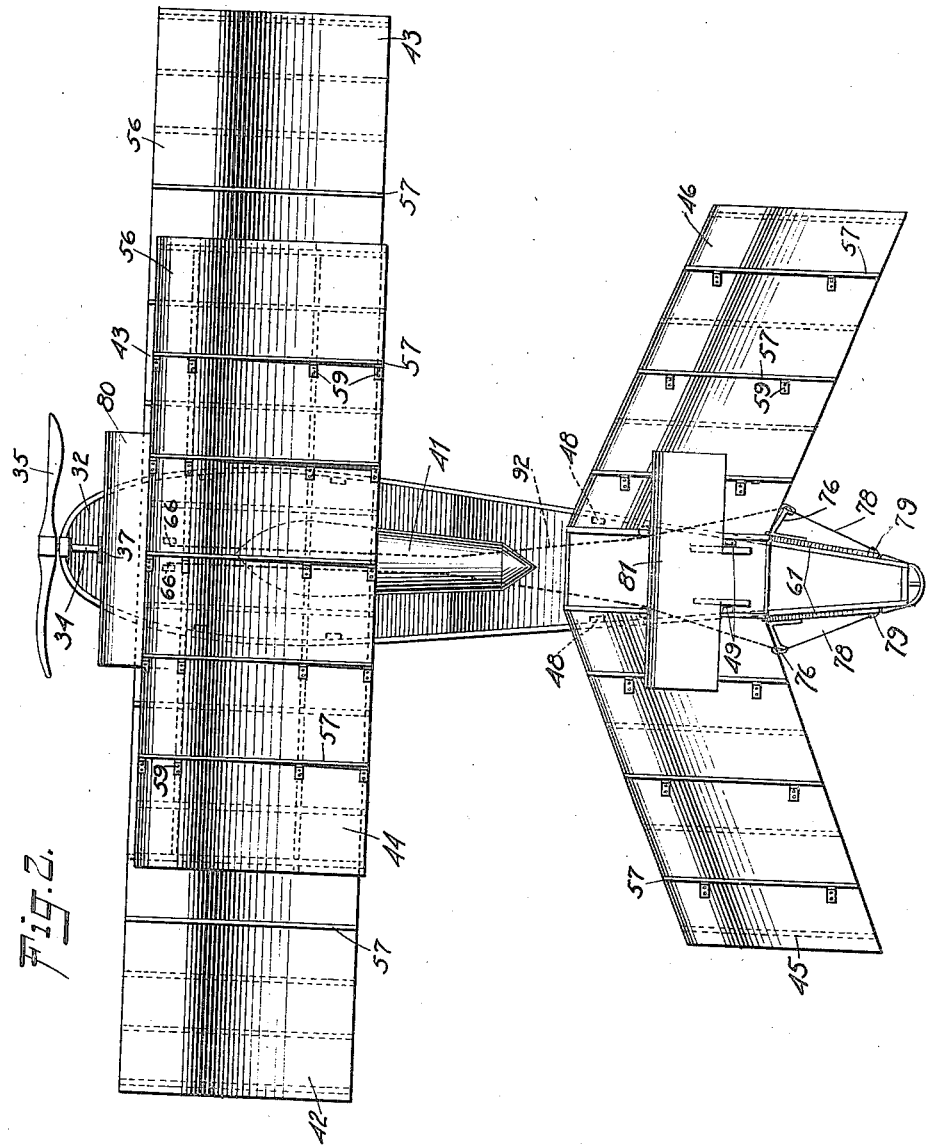

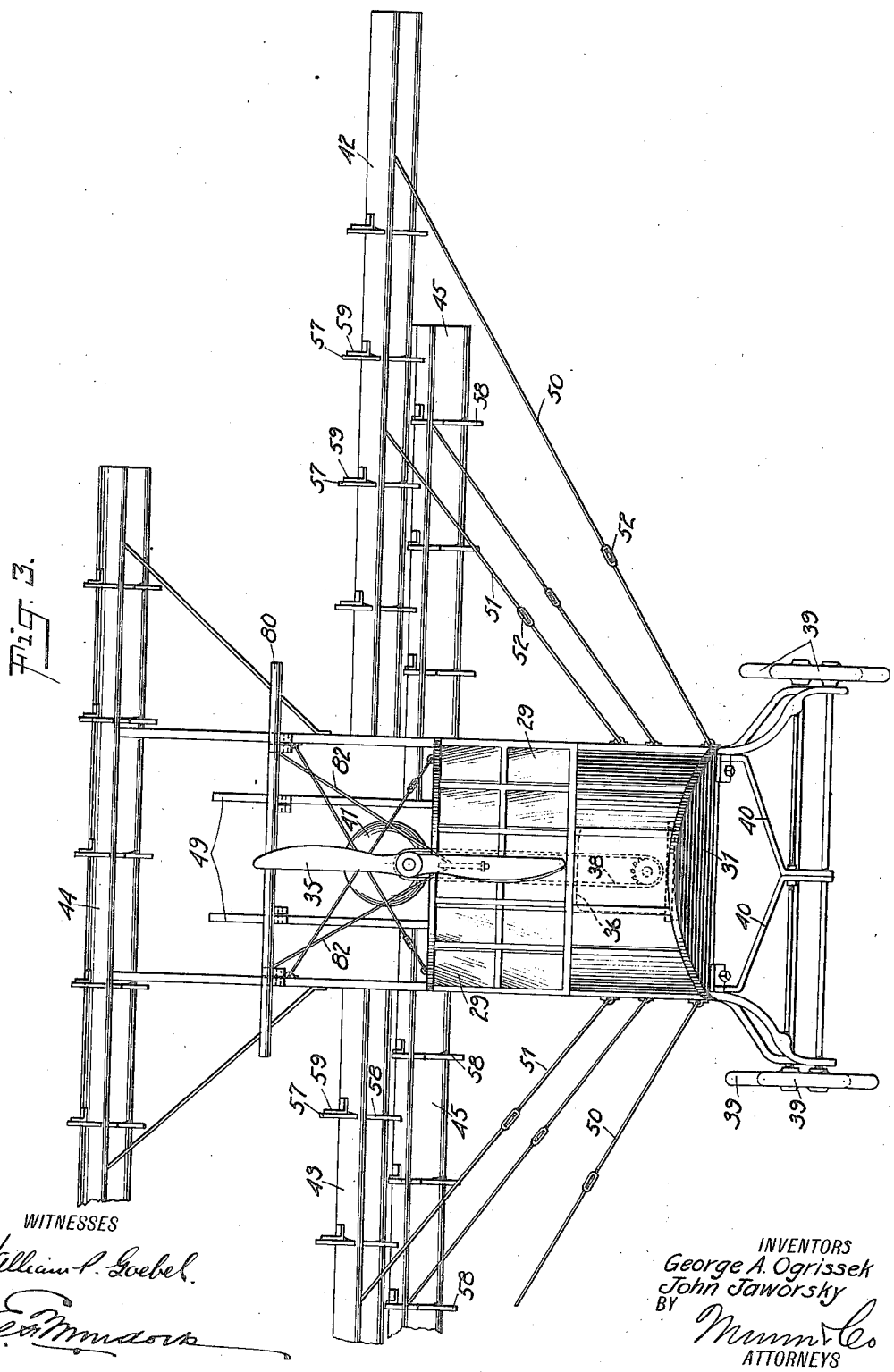

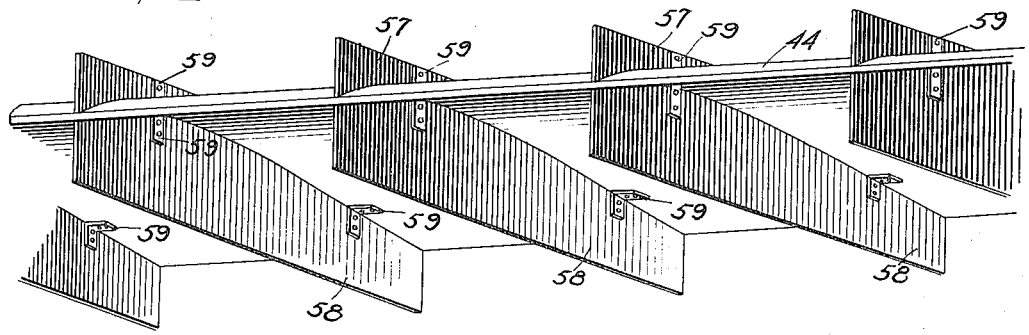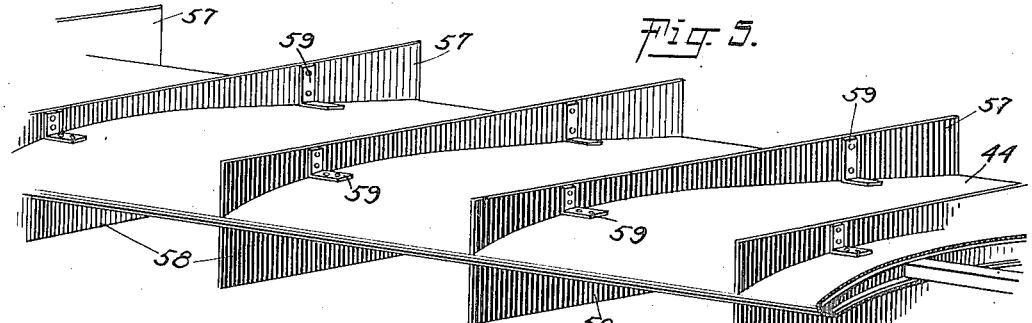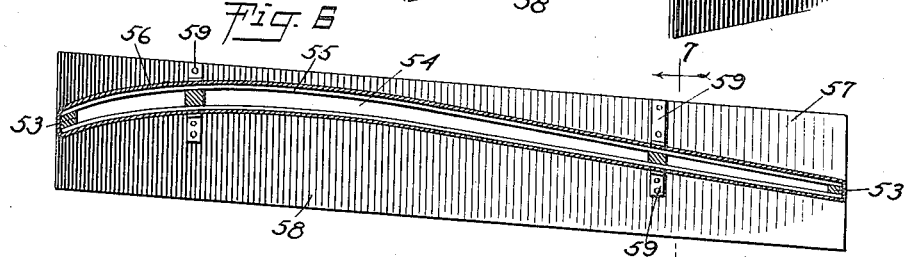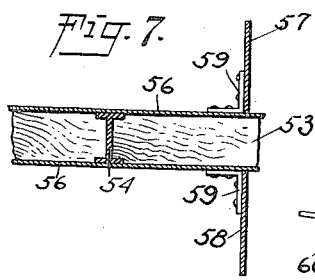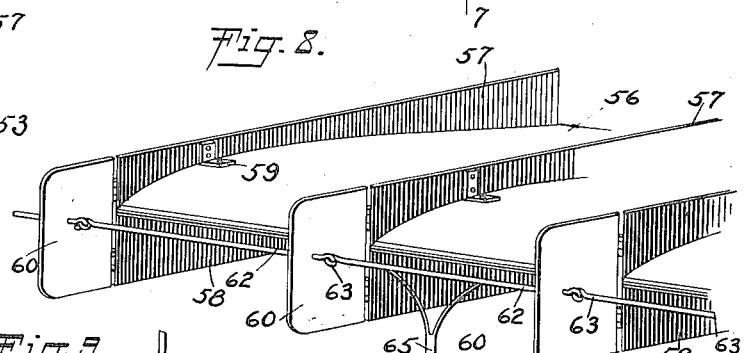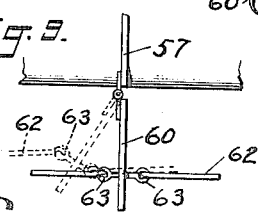

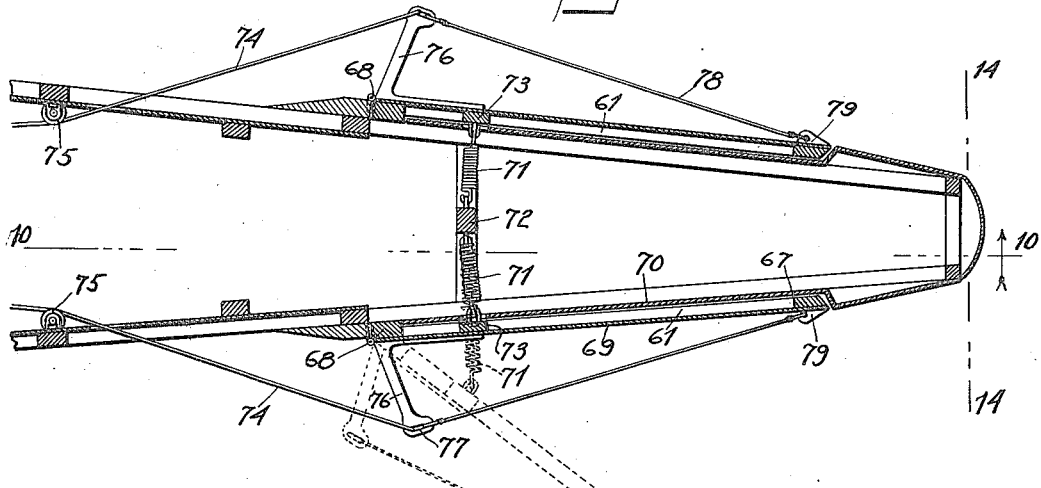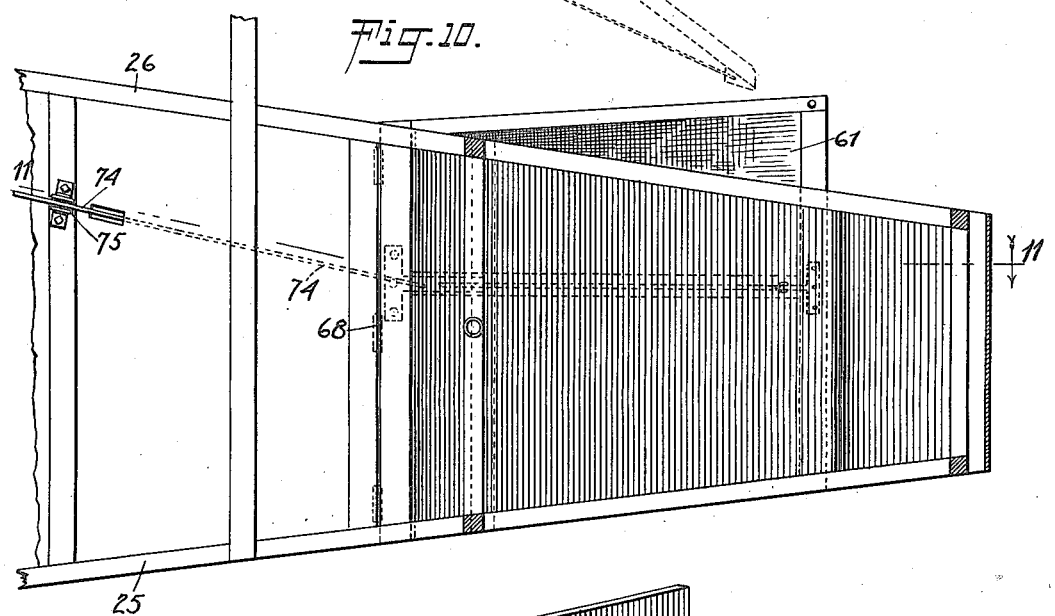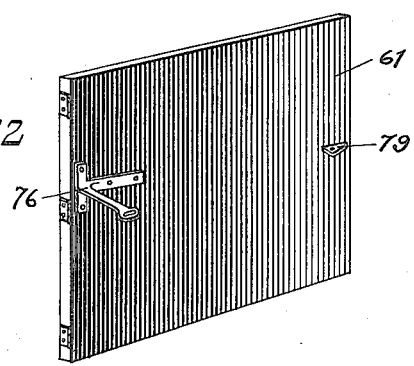

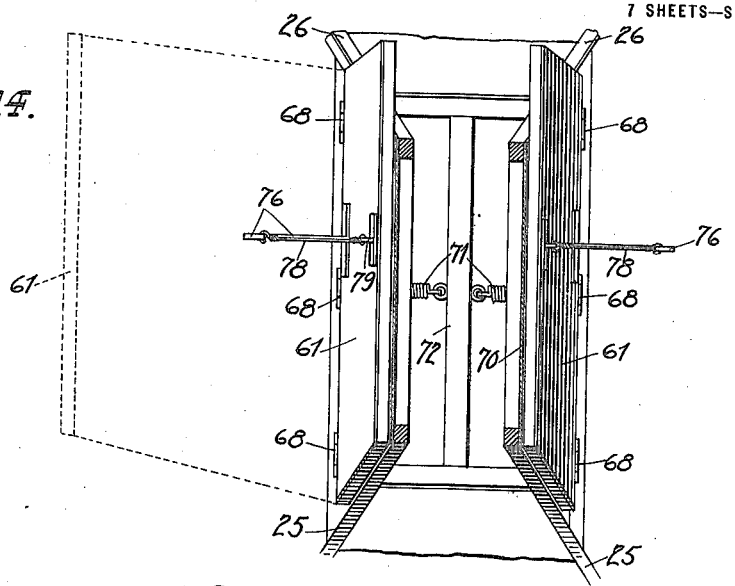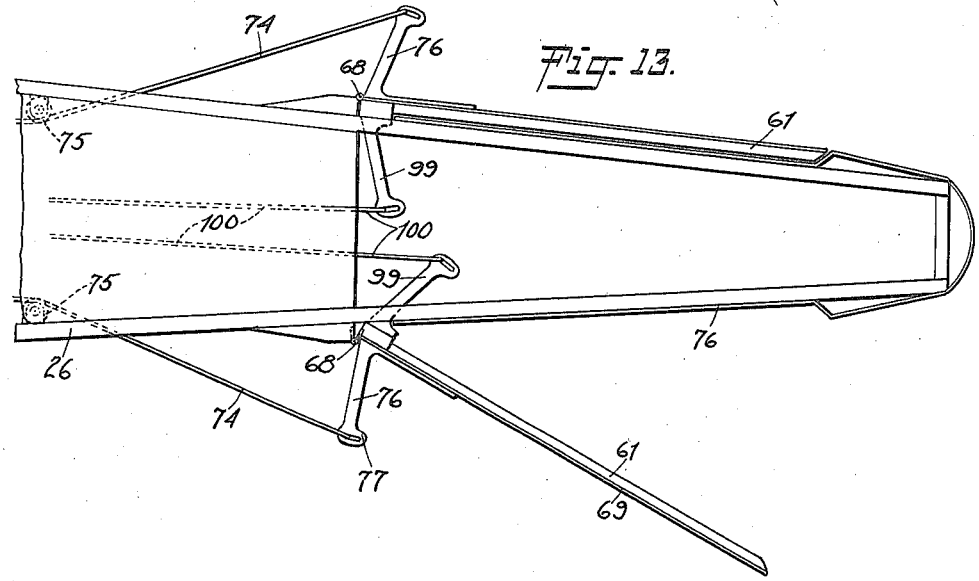

G. A. OGRISSEK & J. JAWORSKY.
AIRCRAFT.
APPLICATION FILED AUG. 27, 1914.
1,157,636.
Patented Oct. 19, 1915.
7 SHEETS—SHEET 7.
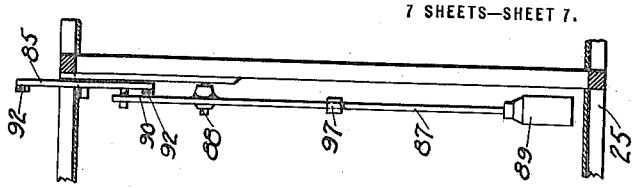
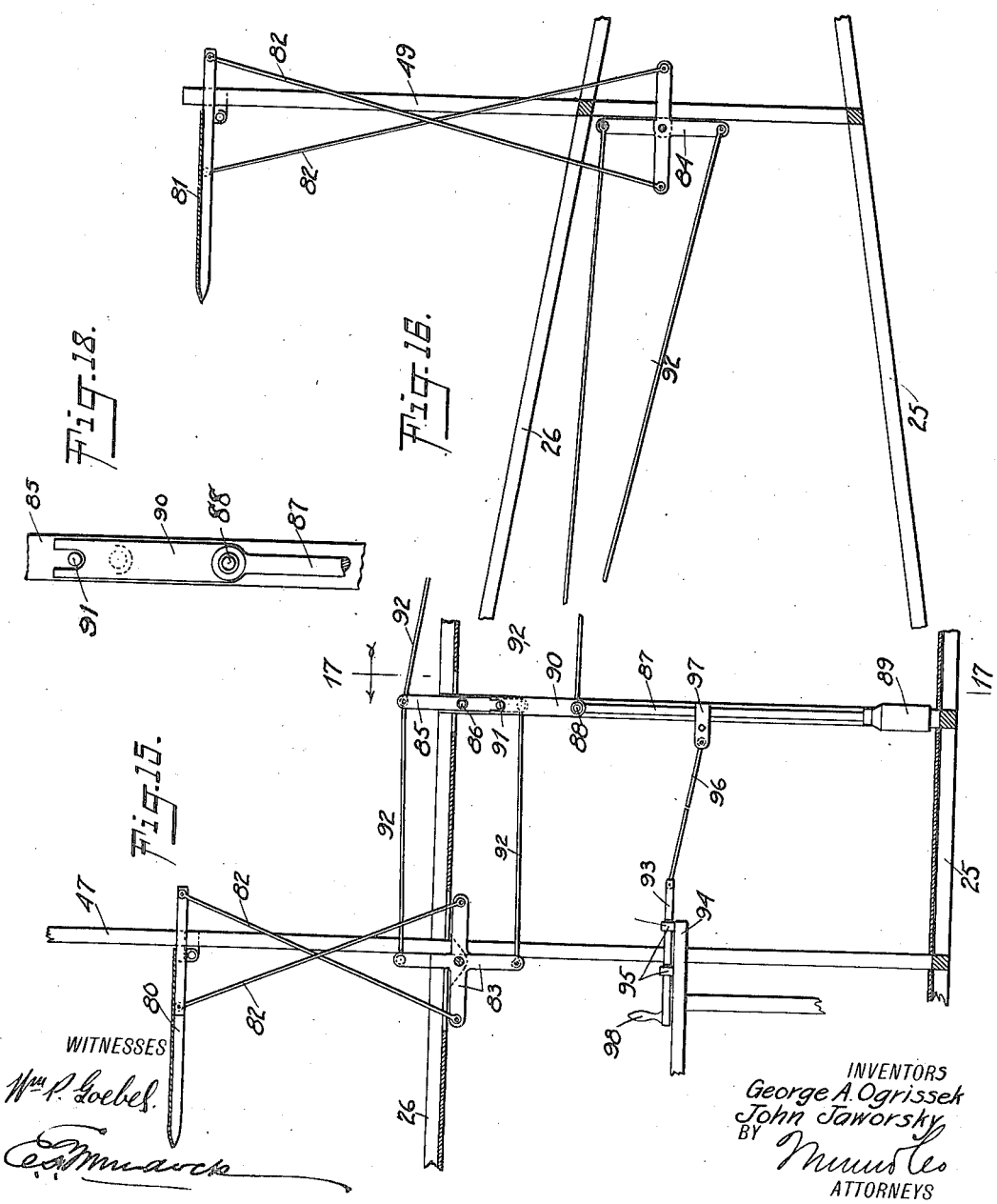

UNITED STATES PATENT OFFICE.

GEORGE A. OGRISSEK AND JOHN JAWORSKY, OF LOS ANGELES, CALIFORNIA.

AIRCRAFT.

1,157,636. Specification of Letters Patent. Patented Oct. 19, 1915.

Application filed August 27, 1914. Serial No. 858,802.

*To all whom it may concern:*

Be it known that we, GEORGE A. OGRISSEK and JOHN JAWORSKY, citizens of the United States, and residents of Los Angeles, in the county of Los Angeles and State of California, have invented a new and Improved Aircraft, of which the following is a full, clear, and exact description.

Among the principal objects which the present invention has in view are:—to provide carrying planes constructed and arranged to avoid lateral slippage and to automatically correct the horizontal planes thereof; to provide means for automatically maintaining the line of flight, said means being manually controllable to vary the line of flight; to provide means for reinforcing the levitating structure without increasing the head pressure thereof; to provide longitudinal stabilizing mechanism automatically operable and manually controllable; to provide steering means manually controllable for altering the line of flight in the horizontal plane; to provide a drag for arresting and banking the machine in flight, and to provide levitating members and a car body supported thereby, said members being distributed in correspondence with the resistance offered by said car body to levitation.

*Drawings.*—Figure 1 is a side elevation of an air craft constructed and arranged in accordance with the present invention; Fig. 2 is a plan view of the same on a slightly reduced scale; Fig. 3 is a front view of the same, portions of the carrying planes on one side of the craft being removed; Fig. 4 is a detail view in perspective showing the middle fragment of the carrying plane constructed and arranged in accordance with the present invention, said plane being seen from below; Fig. 5 is the same construction as seen from above; Fig. 6 is a longitudinal section of one of the carrying planes; Fig. 7 is a cross section of a fragment of the carrying plane, the section being taken on the line 7—7 in Fig. 6; Fig. 8 is a perspective view seen from above of a fragment of carrying planes having fins constructed and arranged in accordance with a modified form of the invention; Fig. 9 is a detail view in plan of the forward end of one of the fins and adjacent portion of carrying plane on which said fin is mounted, constructed in accordance with the modified form shown in Fig. 8 of the drawings; Fig. 10 is a detail view on a large scale showing in longitudinal section a tail fragment of the car body and the drag member mounted thereon, the section being taken on the line 10—10 in Fig. 11; Fig. 11 is a horizontal section taken on the line 11—11 in Fig. 10; Fig. 12 is a detail view in perspective, showing the outer side of one of the drag members; Fig. 13 is a top plan view of a tail fragment of the car body, one of the drag members being shown as inactively disposed and the other drag member being shown as actively disposed; Fig. 14 is a section of the fragment shown in Fig. 11, the section being taken on the line 14—14 in said figure; Fig. 15 is a detail view showing a portion of the framing of the forward end of the craft and means for operating the forward stabilizing plane thereof; Fig. 16 is a view of the framing of a following section of the frame and means for operating the stabilizing plane disposed at this point on the frame; Fig. 17 is a fragmental section taken on the line 17—17 in Fig. 15; and Fig. 18 is a detail view on an enlarged scale showing the means provided for operating the rocking lever controlling the fore and aft stabilizing planes.

*Description.*—As seen in the accompanying drawings the car body is formed with sill rails 25 and top rails 26 rectangularly disposed and united by stanchions 27 to form a box-like structure having panels 28 constructed from fabric, wood veneer or other suitable material. At its forward end the car is rounded to form a pilot house to which light is admitted by windows 29. The car body is provided with a door 30 through which access is afforded to the interior of the car or pilot house.

The house is provided with a suitable floor, the forward end whereof is upwardly inclined to form the breast 31. The body is suitably roughened and at the forward end thereof directly above the breast 31 a platform 32 is provided to hold the standards 33 which provide bearings for the shaft 34 whereon is mounted the aero-propeller 35.

The propeller 35 and the shaft 34 thereof are driven by a motor 36 shown best by dotted lines in Fig. 1 of the drawings. Said motor is of any suitable design or pattern, and the driving shaft thereof is operatively connected with a sprocket wheel 37 by means of a sprocket chain 38. The propeller 35 exerts sufficient power to maintain the craft in flight and to completely or partially propel the same over the ground when the car rests on the wheels 39. The wheels are suitably mounted in bearings formed in the legs 40. The motor 36 is supplied with fuel from a torpedo-shaped tank 41 supported upon the roof of the car body, as shown best in Figs. 1 and 2 of the drawings.

The capacity of the car body and the weight disposed therein is in proportion to the surface of the carrying planes 42, 43, 44, 45 and 46. The said planes are mounted upon masts 47, 48 and 49, said masts being incorporated, as shown in the drawings, in the structure of the car body.

The masts 47 are connected at their tops by the plane 44. The planes 42 and 43 which are shown best in Fig. 3 of the drawings are extended laterally and in opposite directions from the said masts 47 and are held against the upper pressure by the guy cables 50 and 51. From time to time the slack or stretch of the cables is taken up by the turn-buckles 52. The planes 45 and 46 as shown best in Fig. 2 of the drawings, are set back from the masts 48 and 49 to increase the longitudinal extension of the said planes and to carry the extremes thereof to or beyond the end of the tail frame of the craft. The carrying planes 42 to 46 inclusive, have similar construction. As shown best in Fig. 6 of the drawings, each plane is provided with a series of transversely disposed braces 53. The braces 53 are connected by suitable ribs 54 and a thin sheathing 55 provided to support and rigidly hold the cover or skin 56. The skin 56 is preferably unbroken from end to end of the planes in a manner conventional in aeroplane construction.

At predetermined intervals the planes are provided with the upper fins 57 and the under fins 58. The fins 57 and 58 are mounted on the said planes and secured to the braces 53 thereof by metal brackets 59, which serve to hold rigid and in parallel relation the said fins.

As shown in the drawings, all of the planes 42 and 46 inclusive are thus provided with the upper and lower fins. The depth or height of the fins is varied to suit the taste of the designer or needs of the navigator for which the craft is intended. The channels formed between the said fins are in all instances parallel with the axis of the craft and serve to normally maintain the line of flight of the craft. A further function of the fins and particularly of the fins 58, is to maintain the stability of the craft and to prevent the side slip thereof incident to becoming uptilted. The said fins also operate as lateral stabilizing devices, each fin forming in conjunction with the skin of the aeroplane, pockets to catch the air currents when turned down into the path thereof. In the laterally tilted position of the air craft, it has been found that the lowered edges of the planes, offer the greatest resistance to the air currents, and exert a surplus of power to right the planes, and the craft having the same.

In the preferred construction it is found unnecessary to correct or otherwise influence the directive control of the fins 57 and 58. In the modified form of the invention as shown in Figs. 8 and 9 of the drawings, means such as rudders 60 are employed to modify the directive influence or in some instances, to supplement the steering offered of the drag planes 61. The rudders 60 are operatively united by connecting rods 62. The rods 62 are link-connected as seen best in Figs. 8 and 9 of the drawings at points marked 63 therein. The rudders 60 are operated by the aviator, the cables 64 being operatively connected with a pendent rod 65 extended from one of the connecting rods 62 as shown best in Fig. 8 of the drawings, said cables being operatively connected with the steering lever as shown best in Fig. 1 of the drawings. In said figure the connection referred to is not disclosed, the construction employing the rudders as above stated, being optional and a modification of the preferred form of the invention.

The craft is laterally steered in its course by the operation of the drag planes 61. The planes 61 are furnished with framing members 67, the frame composed by which, being supported on the frame of the body of the craft by hinges 68. The frame is covered by a skin 69 of suitable fabric metal or wood veneer. Disposed on the outer surface of the said frame, the frame normally rests in a pocket in the side of the body structure, said pocket being formed by the inset cover or skin 70 as shown in Fig. 11 of the drawings.

The planes 61 are normally held in the pockets provided therefor by the springs 71. The inner ends of the springs 71 are entered to the upright 72 between the sides of the body frame. The outer ends of the said springs are secured to the framing members 73 forming a part of the frame of the drag planes 61. The normal operation of the springs is to retain the planes 61 securely within the pockets provided therefor. To operate the planes actively, the cables 74 are employed. The cables 74 as best seen in Fig. 1 of the drawings, are connected to the steering levers 66 in the pilot house of the car body. The cables are supported within the body and extend rearwardly to the guy pulleys 75 over which they rove and are anchored to the bracket arms 76. The bracket arms 76 are rigidly mounted on the planes 61 and are provided at the outer ends thereof with elongated slots 77 to receive one end of the guys 78. The guys 78 are anchored by the plates 79 to the free edge of the drag planes 61. The slots 77 also receive the ends of the cables 74.

In Fig. 11 of the drawings there has been shown by dotted lines, the active position of one of the drag planes. When one of the said planes is thus extended from the side of the body at the rear end thereof, it is obvious that the pressure exerted thereon by the medium through which the craft is flying, will deflect the tail of the machine and thereby alter the line of flight thereof. Also it will be understood that the drag thus exerted on one side of the machine will have the effect of retarding that side of the machine with the consequent loss of levitating power by the planes on the same side of the machine. The immediate effect of such loss in power on the part of the carrying planes is to relatively lower or depress, producing in the action of the craft an effect known in the art as banking. It has been found that the bank produced in this manner is proportional to the effective operation of the planes 61.

When it is desired to retard or arrest the flight of the craft, this is accomplished by the aviator operating both of the levers 66 to set both of the drag planes 61 outward to the active position. In proportion as the said planes are extended the flight of the machine will be retarded or arrested. The herein described operation is peculiarly effective in making a landing. It is, therefore, effective and valuable in an ordinary flight when a sudden stop is required to avoid collision.

It has been described how in the normal operation of the fins 58 the lateral stability of the craft is provided for. The longitudinal stability of the craft is maintained by the planes 80 and 81. The planes 80 and 81 are pivotally supported between the masts 47 and the masts 49 respectively.

The vertical extensions of the said levers 83 and 84 are operatively connected with the upper and lower extremities of a rocking lever 85, which as seen best in Fig. 1 of the drawings, is pivotally mounted in the frame of the car body between the quadruple extension levers 83 and 84 and preferably about midway between. The lever 85 will rock on its pivot 86 by the pendulum 87. The pendulum 87 is pivotally mounted by the shaft 88 extended between uprights in the frame of the car body and is provided at the lower end with a weight 89 to suitable dimensions. The said pendulum is provided with a short extension 90, the upper end of which is forked to hold the pin 91 set out from the side of the lever 85. It is obvious that as the pendulum 87 rocks on its pivot, the lever 85 is correspondingly rocked on its pivot.

The upper and lower ends of the lever 85 are connected with the upper and lower ends of the vertical extension of the levers 83 and 84 by means of cables 92. Therefore, the said levers 83 and 84 are impelled to rock on their pivots in correspondence with the rock of the lever 85. By means of the cables 82, the forward ends of the planes 80 and 81 are elevated and depressed in correspondence with the movement of the horizontal extensions of the levers 83 and 84. From the foregoing it will be seen that if the craft dipped at the forward end thereof, the weight 89 would be relatively advanced, first from the position shown in Fig. 1 of the drawings. The extension 90 of the pendulum would rock the lever 85 and the levers 83 and 84 operatively connected therewith to elevate the forward end of the plane 80 and depress the plane 81. The immediate effect of this arrangement of the planes would be to exert an upward lift at the front of the craft and a downward pressure at the rear of the craft, thereby righting or correcting the horizontal line of flight. The reverse action would be true if due to any sudden puff or cross current. The machine is suddenly elevated in this event, the weight 89 moving relatively in the car body toward the rear end thereof, reversing the movement of the lever 85 and parts operatively connected therewith.

The operation of the pendulum 87 is normally automatic. It may, however, be controlled manually by the operation of the slide bar 93. The slide bar 93 is operatively mounted on a table 94 above guide loops 95 as shown best in Fig. 15 of the drawings. The bar 93 is operatively connected with the pendulum 87 by means of the connecting rod 96. The rod 96 is pivotally attached to a clip 97 on the pendulum 87.

It will be seen from the foregoing that when the aviator desires to modify or arrest the action of the pendulum 87, he may do so by grasping the handle 98 to prevent or modify the operation of the said pendulum and parts connected therewith. This control is essential to the proper manipulation of the craft, otherwise when purposely climbing or diving, these operations would be normally corrected, or prevented, by the operation of the pedulum and parts connected therewith, if unrestrained.

While we have shown as in Fig. 11, the preferred form of mechanism for retarding the drag planes 61 as that employing the springs 71, we do not wish to be confined to such construction. In Fig. 13 we have shown a construction employing sectional or interiorly disposed brackets 99 and cables 100 connected therewith, said cables 100 being operatively connected with the levers 66 so as to maintain a correspondence of action between the levers 66 and the drag planes 61.

Claims:—

1. An air craft, comprising an inclosed car body; a plurality of masts mounted upon and extended above said body in rectangular arrangement; a plurality of carrying planes rigidly mounted on said masts above said body to form an open channel above said body and below said planes; a plurality of balancing planes mounted on said masts in transversely-disposed bearings; and a manually-operative controlling mechanism for said balancing planes, adapted to dispose said planes reversely.

2. An air craft, comprising an inclosed car body; a plurality of masts mounted upon and extended above said body in rectangular arrangement; a plurality of carrying planes rigidly mounted on said masts above said body to form an open channel between said body and said planes; a plurality of balancing planes mounted on said masts in transversely-disposed bearings; a manually-operative controlling mechanism for said balancing planes, adapted to dispose said planes reversely; and automatic means operatively connected with said balancing planes to operate the same correctively, to maintain the longitudinal stability of said air craft.

3. An air craft, having an inclosed car body; a plurality of masts mounted upon and extended above said body in rectangular arrangement; a plurality of carrying planes rigidly mounted on said masts above said body to form an open channel between said body and said planes; a plurality of balancing planes mounted on said masts in transversely disposed bearings; a pendulum swinging in a plane parallel with the axis of said craft for operating said balancing planes reversely; and a manually operable mechanism for controlling said balancing planes and said pendulum.

4. An air craft comprising, a plurality of carrying planes, said planes being bowed lengthwise of the said craft and forming elongated downwardly-opening channels transverse the axis of said craft; and a plurality of fins mounted upon said planes in parallel and relatively juxtaposed relation, said fins being each disposed in a vertical plane, said fins forming in conjunction with said planes, channels disposed above and below said planes, the longitudinal edges of the upper and lower fins being parallel and extending at all points away from the surfaces of said planes, said fins being projected from the upper and lower surfaces of said planes and at all points where said fins are mounted on said planes, a distance sufficiently great to retain the air through which the craft is moving as in a boxed channel.

In testimony whereof we have signed our names to this specification in the presence of two subscribing witnesses.

GEORGE A. OGRISSEK.
JOHN JAWORSKY.

Witnesses:
  C. H. EUBANK, Jr.,
  H. S. RUSSELL.